(12) United States Patent
Dayton et al.

(10) Patent No.: X8861
(45) Date of Patent: Jun. 6, 1835

(54) COFFINS, FROM HYDRAULIC CEMENT

(76) Inventors: Daniel Dayton; Hiram Holt; John White

Daniel Dayton Hiram Hoit and John White
Letters Patent

The Schedule referred to in these Letters Patent and making part of the
same containing a description in the words of the said Daniel Dayton
Hiram Hoit and John White themselves of their improvement in
making and constructing coffins from the American or hydraulic ce-
ment

---

Specification of the invention or improvement in making and constructing
coffins from the American or hydraulic cement. The form of the coffin is
first made with common boards of the desired shape and about an inch
less than the desired dimensions as to the sides and ends and planed smooth
and so made as readily to be put up or taken down. The cement is made of the consis-
tency of common mortar. The cement is first laid on a board with a trow
ell or otherwise from one half an inch to three inches in thickness and of a
corresponding thickness all round wider and larger than the form. The form
is then placed on the cement bottom. The cement is then put on the sides
and ends of the form of a thickness corresponding with the bottom all round
and even with the top of the form well finished or smoothed with a trowell
or otherwise. Or the coffin may be formed by plastering the cement in the
manner above specified on the inside of the form made from one half an inch
to three inches larger than the desired dimensions or it may be formed by
first constructing two forms with common boards one less than the desired
dimensions about one inch and the other from one half an inch to three
inches larger than the first then lay the cement upon the bottom of the
outer form then place the inner form or mold upon the cement bottom
and fill in the cement between the forms packed hard and even with
the tops of the forms. and if necessary and in order to prevent the least ad-
hesion of the cement to the forms. first coat them with a thin layer of moist-
ened clay or other materials. And in either case after the cement has become
set it is taken out or off by removing the forms in parts. The lid which is
made whole or for convenience in separate parts is formed on a separate mold mold or moles to correspond in size and thicknesses to that of the main part of the coffin or to project over the top of the same about one inch, a groove may be formed in the lid to fit the tongue on top of the coffin, or the lid may be so constructed that one half of the thickness shall fit within the body of the coffin and the other project over the top of the same. To secure the top bolts or pins may be if necessary inserted into the sides of the coffin while the cement is yet soft and holes made in the top or lid to receive the bolts or pins and to be firmly secured with nuts and screws. And when put on for interment the joints around the top should be filled with the same or other cement, should it be desired a piece of thick glass may be placed in the lid for the purpose of seeing into the coffin, and made permanent by being let into the surrounding cement. should it be desired the coffin may be cased either externally or internally with wood, wax, pitch lead or any other metallic substance. such coffins will soon become firm and durable and impervious to air or water and may be put into the earth or vaults and the remains of the deceased may thereby be preserved entire for years. This improvement or invention consists in making coffins of the American or Hydraulic cement and that improvement or invention only is hereby desired to be patented. In testimony whereof that the foregoing is a true specification of our improvement above described we have hereunto set our hands and seals this twenty seventh day of January A.D. 1835.

Witnesses
T. T. Newcomb
Hiram A. Deming

Daniel Dayton
Hiram Hoit
John White

G.P.
Ch.W.

725 nb